INVENTOR.
CARL G. SHOOK
BY
Samuel K. Genca
AGENT

United States Patent Office 3,217,301

Patented Nov. 9, 1965

3,217,301
MEMORY ELEMENT

Carl G. Shook, Rochester, N.Y., assignor to General Dynamics Corporation, Rochester, N.Y., a corporation of Delaware Filed June 8, 1962, Ser. No. 201,026
9 Claims. (Cl. 340—174)

The present invention relates to a device for magnetically recording and reproducing data and more particularly to an improved memory element.

Although the present invention is suited for more general applications, it is particularly adapted for a data storage device in which magnetic information in binary form can be permanently stored, read out an unlimited number of times nondestructively and can be addressed by coincident currents.

As an aid to understanding the arrangement and construction of a memory element of the present invention, reference is made to Patent No. 2,736,881, issued February 28, 1956, to A. D. Booth. It is known that discrete sections along the longitudinal axis of a rod or wire responsive both to magnetostriction and to magnetization may be used as a means to store information. The discrete sections of the rod can store binary values by being magnetized in either of two remanent flux states. One binary value is associated with one of the remanent states and the other binary value with the other one of the remanent states. The binary values stored in the different sections of the rod at any given time are determined by propagating an acoustic or sonic stress wave along the rod or wire. The material of the rod or wire is of the type which changes electromagnetically under stress, this property preferably being evidenced by a measurable momentary change in magnetic permeability along the discrete sections of the rod which have been magnetized in either of the two remanent flux states. The measurable change in magnetic permeability is indicated as by a signal voltage in readout coils inductively coupled to the discrete sections of the rod. The signal voltage is then processed by circuit means to appear as a time-spaced succession of binary signals.

The binary data can be read out an unlimited number of times nondestructively or new binary data may be established along the discrete sections of the rod by overriding and over-powering the previous data.

Nondestructive readout of binary data by propagating an acoustic stress wave along the rod or wire is desirable in a telephone system for call routing direct subscriber toll dialing, automatic toll counting and electric switching. Although devices such as those just described are desirable, they have not been widely used because there are no kown materials for such wire or rods which possess high retentivity, relatively high magnetostriction sensitivity and rectangular hysteresis loop characteristics. These properties generally found in ferrite cores permit coincident current address of the discrete sections. Coincident current address is desirable because the rod or wire may be placed in a two or three dimensional matrix.

Accordingly, it is a particular object of the present invention to provide a memory element having high retentivity, rectangular hysteresis loop characteristics, relatively high magnetostrictive sensitivity and magnetic stability.

It is another object of the present invention to provide a new and improved memory element for magnetically storing and reproducing data.

It is yet another object of the present invention to provide a memory element which can be read out nondestructively as long as desired and can be addressed by coincident currents.

According to the domain theory of magnetization, the magnetic fields of atoms within small volumes of the material lie parallel. These small volumes which are always magnetized to saturation are called "domains." However, the magnetic field of each domain in a cubic crystal must lie parallel to one of six directions within the crystal and these six directions within the cubic crystals are not always the same for different materials. In a previously nonmagnetized material, the domains will be randomly oriented along the six easy directions of magnetization so that the net magnetization is zero. As a small magnetic field is applied to the material, those domains originally magnetized in the general direction of the applied field grow at the expense of the less favorably oriented domains. As the field is further increased, the domains continue to grow until each crystal in the material is one large domain magnetized in the easy direction of magnetization most nearly coincident with the applied field. As still larger fields are applied and magnetization approaches saturation, the domains rotate so as to align their direction of magnetization with that of the applied field. It is during this rotation process that the reduction or expansion of the material known as magnetostriction takes place.

The Joule effect refers to the change in length parallel to the direction of the magnetizing field and it is this effect that is used to produce the sonic wave described by Booth which travels along the length of a rod or wire producing the detectible electrical effect.

The magnetic properties of ferromagnetic materials change with the application of unidirectional stresses. In this regard, ferromagnetic materials may be classified into two classes, first, those having positive magnetostriction and, secondly, those having negative magnetostriction. Materials such as permalloy containing 68% nickel have positive magnetostriction and materials such as nickel have negative magnetostriction.

The hysteresis loop of nickel, for example, may be made substantially rectangular by the application of compressive stress. However, the magnetostrictive sensitivity of the rod is reduced by the application of a compressive stress, thus the rod or wire cannot be pulsed by a coil inductively coupled to the rod or wire to effect a sonic stress wave throughout the rod or wire. In this situation, a quartz crystal transducer would be required to propagate a sonic pulse through the rod or wire. This, of course, would be a disadvantage because of the relatively high cost of a quartz crystal transducer over a coil inductively coupled to the rod.

In accordance with the present invention, the foregoing and other objects are realized according to the principles of the present invention in one illustrated embodiment thereof comprising a substrate member having given characteristics of elasticity including given elastic limits of tensile and compressive stress, respectively, and a ferromagnetic adherent coating surrounding a first and second fraction of the substrate member. The ferromagnetic adherent coating is bonded onto the first and second fractions of the substrate member and has remanent hysteresis and magnetostrictive properties. In accordance with the invention, the first fraction of the substrate member having had a given stress within the elastic limit applied before the ferromagnetic adherent coating was bonded thereto, whereby the ferromagnetic coating coacts with the first fraction of the substrate member to maintain permanently the ferromagnetic coating contiguous to the first fraction and the first fraction of the substrate member in a stress condition after the given stress has been removed. Thus the memory element has a stressed first fraction having an improved rectangular hysteresis loop characteristic for data storage and a second unstressed fraction having sensitive magnetostrictive properties for propagating the sonic stress wave through the memory element.

Further objects and advantages of the invention will become apparent as the following description proceeds and features of novelty which characterize the invention will be pointed out in the claims annexed to and forming a part of this specification.

For a better understanding of the invention, reference may be had to the accompanying drawings, of which:

Figure 5:
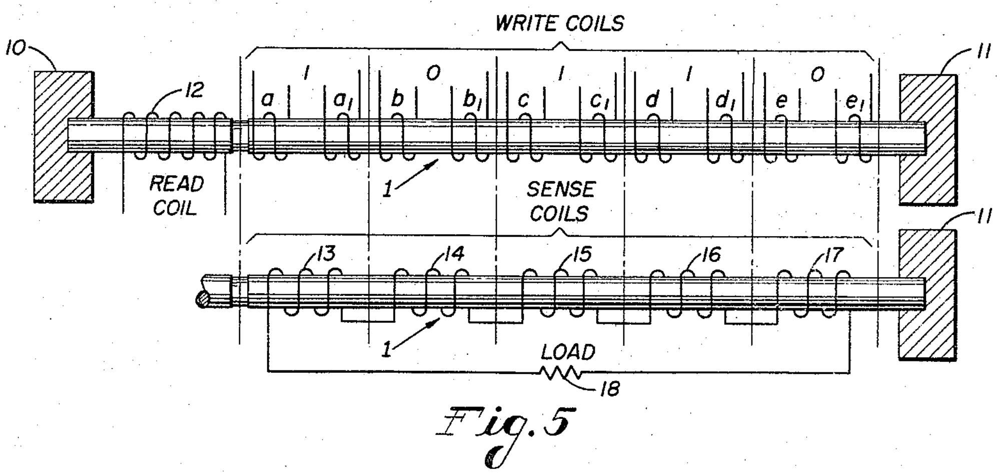
Figure 6:
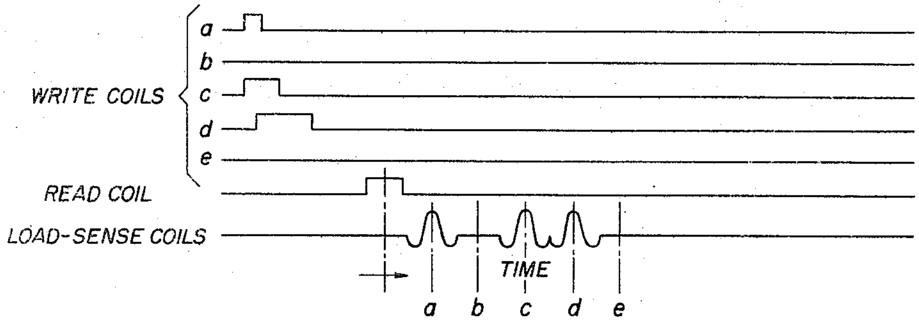

FIG. 5 is a schematic diagram showing a memory element in accordance with the present invention in use exhibiting the property of localized magnetostriction and localized ferromagnetism mounted and provided with a read coil, sense coils and write coils wound thereabouts to record binary information at various positions along its length; and FIG. 6 is a nest of graphs showing how separate write coils and a single read coil may be pulsed and the results obtained in a plurality of sense coils as the pulsing of the read coil moves along the memory element.

Figure 1:
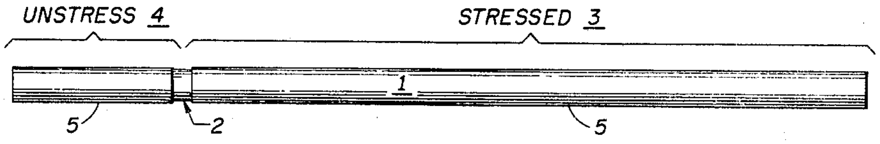
FIG. 1 is a side view of the memory element in accordance with the invention.

Referring now to FIG. 1, a memory element 1, in accordance with a preferred embodiment of the invention, is shown comprising a longitudinal substrate member 2 having a first fraction 3 in a stressed condition and a second fraction 4 in an unstressed condition and a coating of adherent ferromagnetic material 5 bonded onto the substrate member 2.

The substrate member 2 is an elastic medium made of a nonmagnetic and preferably conducting material having given characteristics of elasticity including given elastic limits of tensile and compressive stress. The first fraction 3 of the substrate member 2 had a given unidirectional stress within the elastic limits applied thereto when the ferromagnetic adherent coating 5 was bonded thereto, whereby the ferromagnetic coating 5 coacts with the first fraction 3 of the substrate member 2 to maintain permanently both the ferromagnetic coating 5 contiguous to the first fraction 3 and the first fraction 3 of the substrate member 2 in a stressed condition after the given stress has been removed.

The ferromagnetic coating 5 may be bonded onto the substrate member 2 by such techniques as by electroplating, hot metal spraying, or evaporation techniques.

Ferromagnetic materials may be categorized into two classes which may be affected by stress, the first class being those ferromagnetic materials which have positive magnetostriction, such as 32–68, Fe-Ni alloy, and the second class are those ferromagnetic materials that have negative magnetostriction, such as nickel. The magnetization of materials having positive magnetostriction may be increased by tension and the material expands when magnetized. The magnetization of materials having negative magnetostriction may be increased by compression and the material contracts when magnetized. The magnetostrictive sensitivity of ferromagnetic materials in the first and second class is decreased by stress.

In the preferred embodiment illustrated in FIG. 1, the ferromagnetic coating 5 consists of a thin film of electroplated nickel so as to minimize the effect of eddy currents in the operation of the memory element 1.

Figures 2, 3:
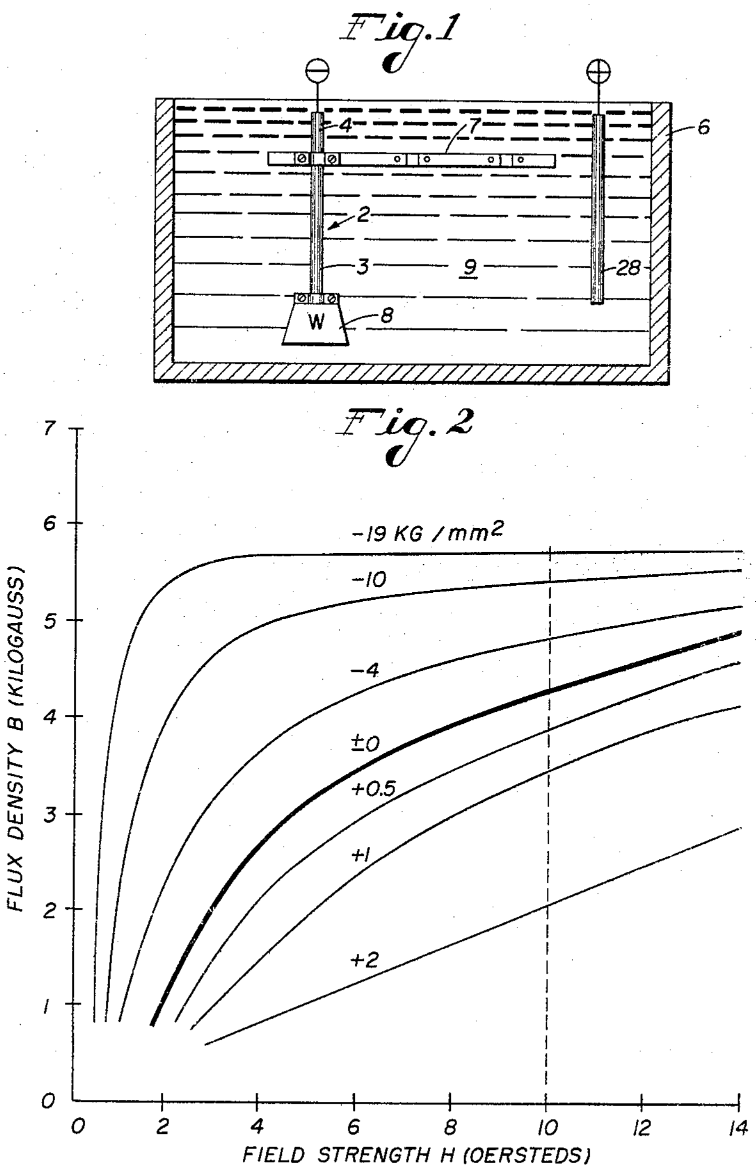
FIG. 2 is a cut-away view of a process for manufacturing the memory element.
FIG. 3 is a graph showing the magnetic properties of nickel under various tension and compression conditions plotted as a function of flux density B versus field strength H.

FIG. 2 shows a method of fabricating by electroplating in a nickel-plate bath 6 a memory element 1, in accordance with the preferred embodiment of the invention. The substrate member 2 is clamped by clamp 7 at a point along its length, dividing the substrate member 2 into first and second fractions 3 and 4, respectively. The first fraction 3 of the substrate member 2 is stressed by a weight 8 within the elastic limits of the substrate member 2. The second fraction 4 disposed above the clamp 7 is unstressed. The substrate member 2 is connected to the negative (—) side of a direct current source and a nickel anode 28 is connected to the positive (+) side of the direct current source, not shown. The plating solution 9 may be of the Watts-type solution; however, it has been found that a sulphamate bath may be used to control the stress in the plated ferromagnetic nickel coating 5 during the plating process. The sulphamate bath forms no part of this invention and is described in "Metal Progress," pages 90–92, April, 1958. After the electroplating process has been completed, the weight 8 is removed. The first fraction of the substrate member 3 and the ferromagnetic nickel coating 5 coact to mutually stress each other as heretofore mentioned. The ferromagnetic nickel coating 5 contiguous to the first fraction 3 remains under a compressive stress condition.

FIG. 3 shows a plot of curves taken of flux density B versus field strength H of nickel under compression and tension. Compression is signified as a minus (—) sign and tension shown as a plus (+) sign. The magnetization of the nickel is increased when nickel is under a compressive stress condition.

Figure 4:
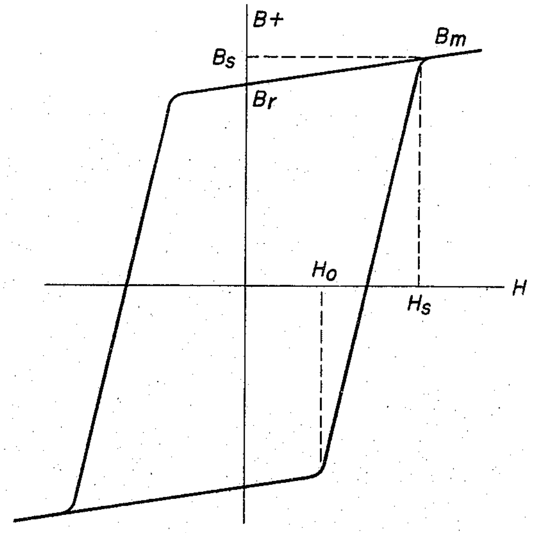
FIG. 4 shows a typical flux density B versus magnetizing force H curve having a high degree of squareness exhibited by the memory element in accordance with the invention.

FIG. 4 shows an oscillograph display illustrating the hysteresis loop of the ferromagnetic nickel coating 5 contiguous to the stressed first fraction 3. As is well known, the rectangular hysteresis characteristics of the ferromagnetic coating 5 permit coincident current address.

Referring now to FIG. 5, a schematic representation of a device utilizing the memory element is illustrated. The memory element 1, for convenience shown twice, is electrically conductive, has substantially rectangular hysteresis characteristics along the first fraction 3 thereof and is magnetostrictive along the second fraction 4 thereof. The memory element 1 is mounted in blocks 10 and 11 to dampen the sonic or acoustic pulse generated and transmitted by a read coil 12. In order to avoid interference in the drawings between write coils A, $A_1$, B, $B_1$, C, $C_2$, D, $D_1$ and E, $E_1$ and sense coils 13, 14, 15, 16 and 17, they are shown separately, although it will be understood that the sense coils are wound directly over the write coils and that this double showing of the memory element 1 is for convenience only. In the upper part of FIG. 5 where the separate write coils A to $E_1$ are shown, the binary digits 1 and 0 are shown to indicate, by way of example, that the binary number 1 0 1 1 0 will be written therein as indicated in FIG. 6, the coils A and $A_1$ will be pulsed by half-select coincident currents to write in a binary 1. In a similar manner, coils C, $C_1$ and D, $D_1$ will be pulsed by half-select coincident currents to write in a binary 1. As indicated in FIG. 5, the coils A, $A_1$, C, $C_1$, D, and $D_1$ will be pulsed and, as further indicated in the graphs shown in FIG. 6, the pulses may be transmitted at random times and may be of random lengths provided they are all completed before the read coil 12 is pulsed.

After the binary number 1 0 1 1 0 has been stored in a memory element 1 by the write coils A, $A_1$, C, $C_1$ and D, $D_1$, the read coil is pulsed and this results in the transmission of a sonic pulse as indicated by the time scale in the read coil and the sense coil graphs of FIG. 6. As this sonic pulse passes one of the sense coils where a remanent magnetic record has been established, a pulse will be induced in the sense coil 13, by way of example, as a sonic pulse passes from the position of origin within read coil 12 toward the right. As this acoustic pulse travels toward the right and then is absorbed and dissipated by the block 11, it will cause a reaction in the sense coils and in the single load coil 18 as shown in the graph of FIG. 6. A device of this type is disclosed in a copending application to Carl. G. Shook, Serial No. 7,292, filed February 8, 1960, and asigned to the same assignee as the present invention.

As mentioned previously, if the memory element 1 is to be used in large arrays, the first fraction 3 should have a rectangular hysteresis loop characteristic to permit coincident current address. Some of the considerations are somewhat different than in the case of toroidal cores used in coincident current memory matrices. FIG. 4 shows a hysteresis loop for the storage portion of the memory element 1. The primary consideration for the storage portion of the memory element is that the ratio of $H_0$ and $H_s$ be greater than 0.5 to allow coincident current address. It is not necessary as in the case of memory cores for the ratio of $B_r$ to $B_m$ to be very close to unity. The reason for this is that reading is not done by attempted switching. Hence, noise from half-writes is not important. This ratio should be sufficiently close to unity so that successive half-writes of polarity opposite that of the storage will not cause excessive storage deterioration.

If desired, the substrate member 2 may be made of a nonconducting material, such as plastic, having given elastic limits. The surface of the plastic must be prepared before a positive or negative magnetostrictive coating is bonded to the surface.

The substrate member 2 may be any shape; however, a longitudinal member circular in cross-section is preferred. If desired, a hollow tube may be employed. The substrate member 2 may be composed of any of a variety of electrically conductive materials, such as an alloy of copper, aluminum, brass or bronze.

The substrate member 2 may be stressed by means other than as that shown in FIG. 2. For example, the substrate member may be stressed between racks or plated continuously under stress between rollers leaving, of course, a fraction plated unstressed.

While a particular embodiment of the invention has ben shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed is:

1. In a storage device, a memory element comprising,
(a) a substrate member having given characteristics of elasticity including given elastic limits of tensile and compressive stress, respectively, and
(b) a ferromagnetic adherent coating surrounding a first and second fraction of said member,
(c) said ferromagnetic adherent coating being bonded onto said first and second fraction of said substrate member and having remanent hysteresis and magnetostrictive properties,
(d) only said first fraction of said member having had a given stress within said elastic limit applied thereto when said ferromagnetic adherent coating was bonded thereto whereby said ferromagnetic coating coacts with said first fraction of said member to maintain permanently only both said ferromagnetic coating continguous to said first fraction and said first fraction of said member in a stressed condition after said given stress has been removed, said second fraction remaining in an unstressed condition.

2. In the memory element defined in claim 1 wherein said substrate member is an electrical conductor member.

3. In the memory element defined in claim 1 wherein said substrate member is a dielectric member.

4. In a storage device, a memory element comprising,
(a) a substrate member having given characteristics of elasticity including given elastic limits of tensile and compressive stress, respectively,
(b) a ferromagnetic adherent coating surrounding a first and second fraction of said member,
(c) said ferromagnetic adherent coating being bonded onto said first and second fraction of said substrate member and having remanent hystresis and negative magnetostrictive properties,
(d) only said first fraction of said member having had a given tensile stress within said elastic limit applied thereto when said ferromagnetic adherent coating was bonded thereto whereby said ferromagnetic coating coacts with said first fraction of said member to maintain permanently only both said ferromagnetic coating contiguous to said first fraction and said first fraction of said member in a compressive and tensile stressed condition, respectively, after said given stress has been removed, said second fraction remaining in an unstressed condition.

5. In a storage device,
(a) a memory element comprising, a substrate member having given characteristics of elasticity including predetermined elastic limits of tensile and compressive stress, respectively,
(b) a first ferromagnetic adherent coating surrounding a first fraction of said member, and
(c) a second ferromagnetic adherent coating surrounding a second fraction of said member,
(d) both said first and second adherent coatings being bonded onto said substrate member and having remanent hysteresis and magnetostrictive properties,
(e) only said first fraction of said member having had a given stress within said elastic limits applied thereto when said first ferromagnetic adherent coating was bonded thereto whereby said first ferromagnetic coating coacts with said first fraction of said substrate member to maintain permanently only both said first ferromagnetic coating and said first fraction of said member in a stressed condition after said given stress on said first fraction has been removed, said second fraction remaining in an unstressed condition.

6. The memory element defined in claim 5 wherein said first ferromagnetic adherent coating is nickel.

7. In a storage device,
(a) a memory element comprising a substrate member having given characteristics of elasticity including predetermined elastic limits of tensile and compressive stress, respectively,
(b) a first ferromagnetic adherent coating surrounding a first fraction of said member,
(c) a second ferromagnetic adherent coating surrounding a second fraction of said member,
(d) both said first and second adherent coatings being bonded on said substrate member, said first ferromagnetic adherent coating having remanent hysteresis and magnetostrictive properties, said second ferromagnetic adherent coating having magnetostrictive properties,
(e) only said first fraction of said member having had a given stress within said elastic limits applied thereto when said first ferromagnetic adherent coating was bonded thereto whereby said first ferromagnetic coating coacts with said first fraction of said substrate member to maintain permanently only both said first ferromagnetic coating and said first fraction of said member in a stressed condition after said given stress on said first fraction has been removed, said second fraction remaining in an unstressed condition.

8. In a storage device,
(a) a memory element comprising a substrate member having given characteristics of elasticity including predetermined elastic limits of tensile and compressive stress, respectively,
(b) a first ferromagnetic adherent coating surrounding a first fraction of said member, and
(c) a second ferromagnetic adherent coating surrounding a second fraction of said member,
(d) both said first and second adherent coatings being bonded on said substrate member and having remanent hysteresis and negative magnetostrictive properties, (e) only said first fraction of said member having had a given tensile stress within said elastic limits applied thereto when said first ferromagnetic adherent coating was bonded thereto whereby said first ferromagnetic coating coacts with said first fraction of said substrate member to maintain permanently only said first ferromagnetic coating in compression and said first fraction of said member in tension after said given tensile stress on said first fraction has been removed, said second fraction remaining in an unstressed condition.

9. In a storage device, (a) a memory element comprising a substrate member having given characteristics of elasticity including predetermined elastic limits of tensile and compressive stress, respectively, (b) a first ferromagnetic adherent coating surrounding a first fraction of said member, (c) a second ferromagnetic adherent coating surrounding a second fraction of said member, (d) both said first and second adherent coatings being bonded on said substrate member and having remanent hysteresis and positive magnetostrictive properties, (e) only said first fraction of said member having had a given compressive stress within said elastic limits applied thereto when said first ferromagnetic adherent coating was bonded thereto whereby said first ferromagnetic coating coacts with said first fraction of said substrate member to maintain permanently only said first ferromagnetic coating in tension and said first fraction of said member in compression after said given compressive stress on said first fraction has been removed, said second fraction remaining in an unstressed condition.

References Cited by the Examiner

UNITED STATES PATENTS

| | | | |
|---|---|---|---|
| 2,790,160 | 4/57 | Millership | 340—174 |
| 2,792,563 | 5/57 | Rajchman | 340—174 |
| 3,083,353 | 3/63 | Bobeck | 340—174 |

IRVING L. SRAGOW, *Primary Examiner.*